United States Patent
Chang (10) Patent No.: US 8,418,493 B2
(45) Date of Patent: Apr. 16, 2013

(54) REFRIGERANT RECOVERY MACHINE WITH IMPROVED CAM WHEEL ASSEMBLY

(75) Inventor: An-Chao Chang, Kueishan Hsiang (TW)

(73) Assignee: Sun-Wonder Industrial Co., Ltd., Taoyuan Hsien (TW)

( * ) Notice: Subject to any disclaimer, the term of this patent is extended or adjusted under 35 U.S.C. 154(b) by 820 days.

(21) Appl. No.: 12/573,866

(22) Filed: Oct. 5, 2009

(65) Prior Publication Data

US 2011/0079036 A1    Apr. 7, 2011

(51) Int. Cl.
*F25B 45/00* (2006.01)
*F16H 53/00* (2006.01)
*F04B 1/04* (2006.01)

(52) U.S. Cl.
USPC .............. 62/292; 62/74; 74/567; 74/570.1; 74/570.2; 417/273; 417/397

(58) Field of Classification Search ............. 62/74, 292; 417/273, 397; 74/567, 570.1, 570.2
See application file for complete search history.

(56) References Cited

U.S. PATENT DOCUMENTS

| | | | | |
|---|---|---|---|---|
| 734,595 | A | * | 7/1903 | Olin ................................. 74/50 |
| 2,634,904 | A | * | 4/1953 | Clerc ............................. 418/96 |
| 4,559,838 | A | * | 12/1985 | Neuenschwander .............. 74/50 |
| 5,017,108 | A | * | 5/1991 | Murayama et al. .......... 418/55.6 |
| 5,030,065 | A | * | 7/1991 | Baumann ...................... 417/273 |
| 5,846,059 | A | * | 12/1998 | Mizuno et al. ................ 417/273 |
| 6,422,841 | B2 | * | 7/2002 | Kurisu ............................. 418/36 |
| 6,539,835 | B1 | * | 4/2003 | Rasmussen .................... 92/140 |
| 2005/0076888 | A1 | * | 4/2005 | Hanyu .......................... 123/495 |
| 2006/0127231 | A1 | * | 6/2006 | Sundheim ..................... 417/234 |

FOREIGN PATENT DOCUMENTS

JP          62023582 A  *  1/1987

\* cited by examiner

*Primary Examiner* — Frantz Jules
*Assistant Examiner* — Joseph Trpisovsky

(57) ABSTRACT

A high-durability cam wheel assembly mounted in a shell of a refrigerant recovery machine is disclosed to include an open frame member, rigid wear strips mounted in the open frame member at two sides, a sliding block having friction cylinders arranged in parallel at two opposite sides and respectively disposed in contact with the rigid wear strips and a cam wheel set formed of a first cam wheel and a second cam wheel and inserted through an axle bearing in sliding block for causing the sliding block to move back and forth in the open frame member.

6 Claims, 8 Drawing Sheets

REFRIGERANT RECOVERY MACHINE WITH IMPROVED CAM WHEEL ASSEMBLY

BACKGROUND OF THE INVENTION

1. Field of the Invention

The present invention relates to a cooling agent recovery technology and more particularly, to a cam wheel assembly for refrigerant recovery machine that is easy to fabricate and that utilizes wear strips to prolong the service life.

2. Description of the Related Art

Figure 12:
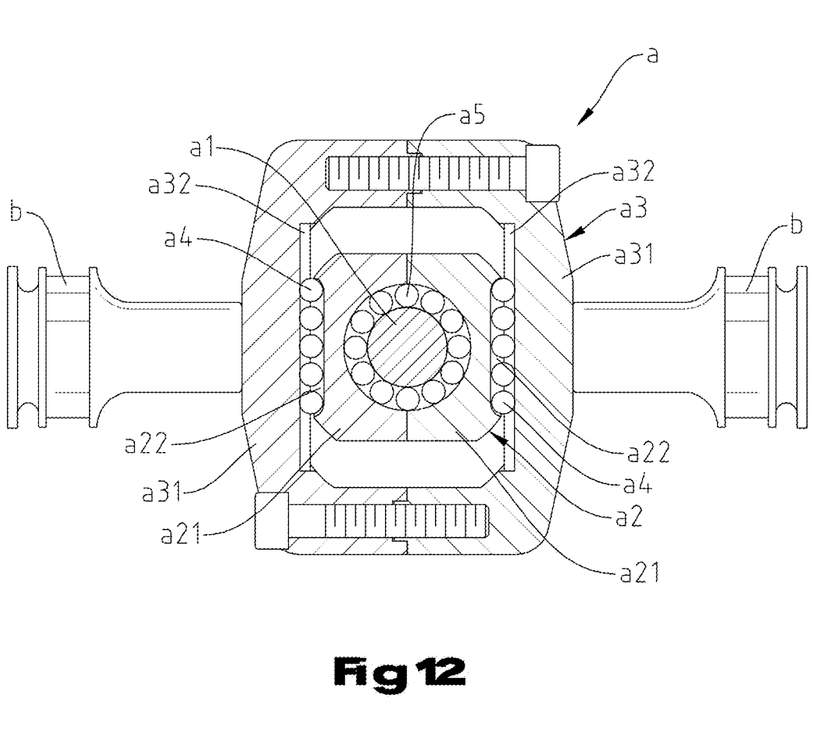
FIG. 12 is a sectional side view of a cam wheel assembly for refrigerant recovery machine according to the prior art.

A conventional refrigerant recovery machine utilizes a cam wheel assembly to move piston means, causing pump members to draw in a refrigerant from the main unit of a cooler system. FIG. 12 shows a cam wheel assembly for refrigerant recovery machine according to the prior art. According to this design, the cam wheel assembly a comprises a single-piece cam wheel a1, a sliding block a2 formed of two block members a21 and arranged around the cam wheel a1, a plurality of rolling needles a5 arranged in between the cam wheel a1 and the sliding block a2, rolling balls a4 mounted in a groove a22 on an outer side of each of the two block members a21 of the sliding block a2 and an open frame member a3 formed of two frame parts a31 and arranged around the sliding block a2. The open frame member a3 comprises two sliding grooves a32 bilaterally disposed on the inside corresponding to the grooves a22 of the sliding block a2. During rotation of the cam wheel a1, the sliding block a2 is forced to move the open frame member a3 transversely back and forth, causing reciprocation of pistons b. At the same time, the sliding block a2 moves up and down in the open frame member a3.

The aforesaid prior art cam wheel assembly a is capable of reciprocating the pistons b, however it still has numerous drawbacks as follows:

1. The open frame member a3 is formed of two frame parts a31. Due to complicated shape design, the frame parts a31 must be processed through a secondary processing process. Due to necessity of a secondary processing process, the frame parts a31 are made by means of powder metallurgy. However, because the frame parts a31 are made by means of powder metallurgy, they are less rigid. In consequence, the sliding grooves a32 wear quickly subject to friction by the rolling balls a4. If a rigid material is used to make frame parts a31 by forging, casting or other techniques, the cost will be relatively increased and the follow-up processing will be complicated.

2. Because the cam wheel a1 is a single-piece member, the two block members a21 of the sliding block a2 must be mounted around the single-piece cam wheel a1 and then fastened together with the rolling needles a5 set in between the cam wheel a1 and the sliding block a2 and the rolling balls a4 mounted in the grooves a22 of the sliding block a2 before installation of the open frame member a3. If the cam wheel assembly a starts to wear or is damaged, the user cannot use substitute component parts from the market for replacement and must ask the original machine provider to provide the necessary component parts for replacement.

3. The rolling balls a4 are mounted in the grooves a22 of the sliding block a2. During displacement of the sliding block a2, the rolling balls a4 in each groove a22 will be forced to hit one another, causing noises. Further, the rolling balls a4 tend to be gathered at one side in each groove a22, causing uneven loading on the sliding block a2 and quick wearing of the sliding block a2.

SUMMARY OF THE INVENTION

The present invention has been accomplished under the circumstances in view. It is one object of the present invention to provide a cam wheel assembly for refrigerant recovery machine, which utilizes rigid wear strips in an open frame member for the contact of friction cylinders at two sides of a sliding block, thereby prolonging the service life without increasing much the manufacturing cost.

It is another object of the present invention to provide a cam wheel assembly for refrigerant recovery machine, which utilizes a cam wheel set comprised of two cam wheels, facilitating the installation of the cam wheel assembly and saving its fabrication time.

To achieve these and other objects of the present invention, a cam wheel assembly is installed in a shell of a refrigerant recovery machine, comprising an open frame member, rigid wear strips mounted in the open frame member at two sides, a sliding block having friction cylinders arranged in parallel at two opposite sides and respectively disposed in contact with the rigid wear strips and a cam wheel set formed of a first cam wheel and a second cam wheel and inserted through an axle bearing in sliding block for causing the sliding block to move back and forth in the open frame member.

DETAILED DESCRIPTION OF THE PREFERRED EMBODIMENT

Referring to FIGS. 1~5, a refrigerant recovery machine is shown comprising a shell 1, a motor and fan set 2, a plurality of, for example, two piston devices 3, a plurality of, for example, two pump component sets 4 and a cam wheel assembly 5.

The shell 1 comprises a shell body 11, an accommodation chamber 111 defined in the shell body 11, a back cover 12 covering one side, namely, the rear side of the shell body 11 and a gasket member 13 set in between the border of the back cover 12 and the shell body 11.

The motor and fan set 2 comprises a motor holder 21 connected to one side, namely, the front side of the shell body 11 opposite to the back cover 12, a motor 22 mounted in the motor holder 21 and a fan 23 coupled to the motor 22.

The piston devices 3 are mounted in the shell body 11 at two opposite sides and disposed adjacent to the motor and fan set 2, each comprising a barrel 31 connected to one of two opposite lateral sides of the shell body 11, a piston 32 peripherally mounted with friction rings 321 and inserted with the friction rings 321 into the barrel 31 and a gasket ring 33 sealed in between the barrel 31 and the shell body 11.

Each pump component set 4 comprises a valve seat 41 connected to one end of the barrel 31 of one piston device 3 outside the shell body 11, an inlet pipe 42 mounted on the valve seat 41 at one side and an outlet pipe 43 mounted on the valve seat 41 at an opposite side.

The cam wheel assembly 5 comprises a frame member 51, a sliding block 52 and a cam wheel set 53. The frame member 51 is an open frame formed of two symmetrical frame parts 511. Each frame part 511 comprises a base 4111, and two arms 5112 respectively extended from two distal ends of the base 4111 in a parallel manner. The arms 5112 of one of the two frame parts 511 are respectively connected to the arms 5112 of the other of the two frame parts 511 by respective fastening members 5113. Further, wear strips 512 are fixedly mounted in the base 4111 of each of the two frame parts 511. A bonding material (for example, bronze) may be embedded in the base 4111 of each of the two frame parts 511 for the connection of wear strips 512. The wear strips 512 are prepared from a wear resistant material having a higher rigidity than the frame member 51. The sliding block 52 is a single piece member mounted inside the frame member 51, having a center through hole 522. Further, friction cylinders 521 are arranged on each of two opposite sidewalls of the sliding block 52 in a row and kept in contact with the wear strips 512 in each of the two frame parts 511 of the frame member 51. Further, an axle bearing 523 is mounted in the center through hole 522 of the sliding block 52. The axle bearing 523 can be a ball bearing or needle bearing. The cam wheel set 53 comprises a first cam wheel 531 and a second cam wheel 532 arranged at two opposite sides relative to the sliding block 52. The first cam wheel 531 comprises a coupling rod 5311 eccentrically extended from one side thereof adjacent to the sliding block 52 and inserted into the axle bearing 523, and a pivot rod 5312 perpendicularly extended from the center of an opposite side thereof. The second cam wheel 532 comprises a coupling tube 5321 eccentrically extended from one side thereof adjacent to the sliding block 52 and coupled to the coupling rod 5311 of the first cam wheel 531 in the axle bearing 523, and a connection rod 5322 perpendicularly extended from the center of an opposite side thereof. Further, counterweights 533 are respectively mounted on the periphery of the first cam wheel 531 and the periphery of the second cam wheel 532.

When mounting the cam wheel assembly 5 in the accommodation chamber 111 of the shell 1, connect the bases 5111 of the two symmetrical frame parts 511 of the frame member 51 to the two pistons 32 respectively, and then pivotally connect the pivot rod 5312 of the first cam wheel 531 to the back cover 12, and then couple the connection rod 5322 of the second cam wheel 532 to the motor 22. Further, a Teflon axle seal 5323 is mounted around the connection between the connection rod 5322 of the second cam wheel 532 and the motor 22.

Figure 1:
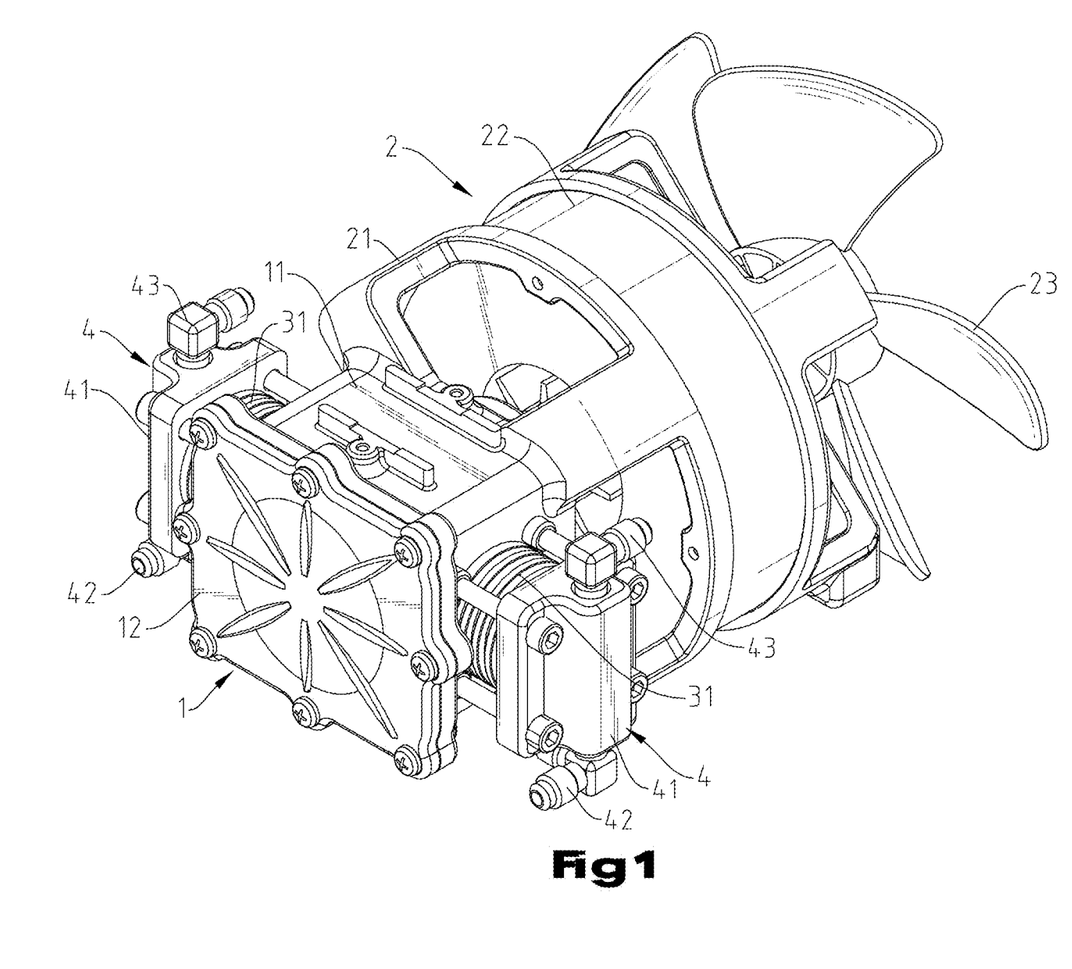
FIG. 1 is an elevational view of a refrigerant recovery machine in accordance with the present invention.
Figure 2:
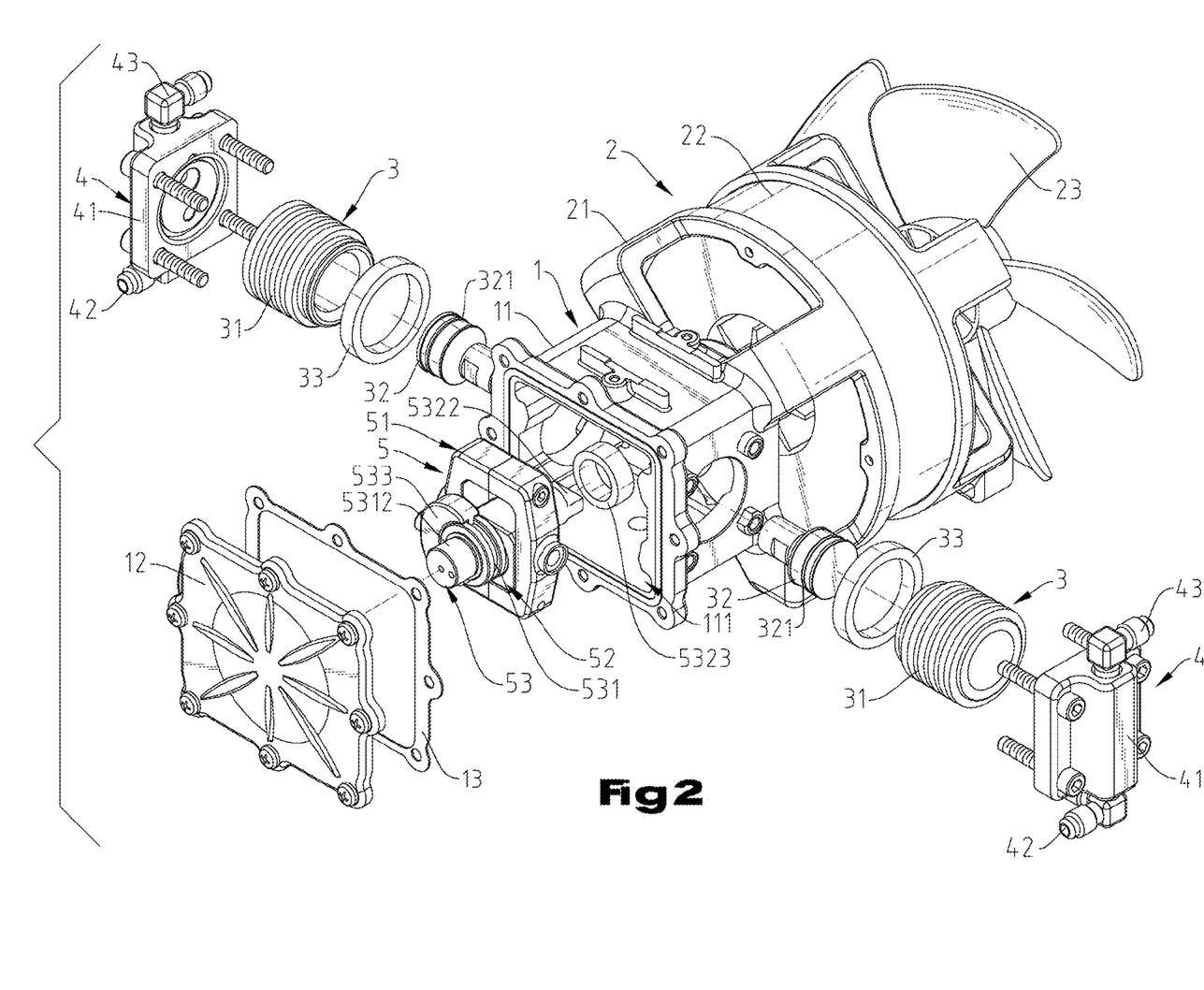
FIG. 2 is an exploded view of the refrigerant recovery machine shown in FIG. 1.
Figure 3:
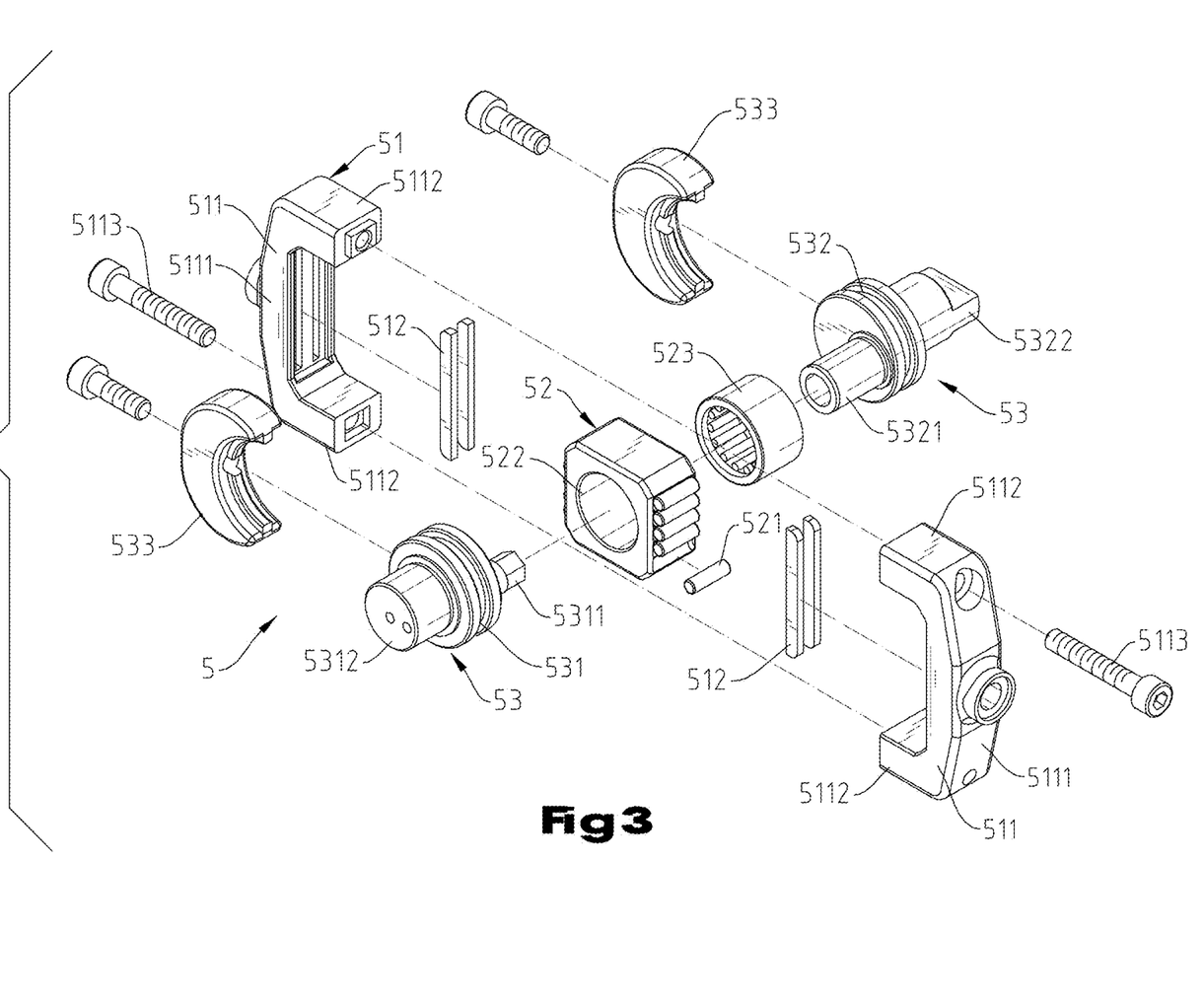
FIG. 3 is an exploded view of the cam wheel assembly of the refrigerant recovery machine shown in FIG. 1.
Figure 4:
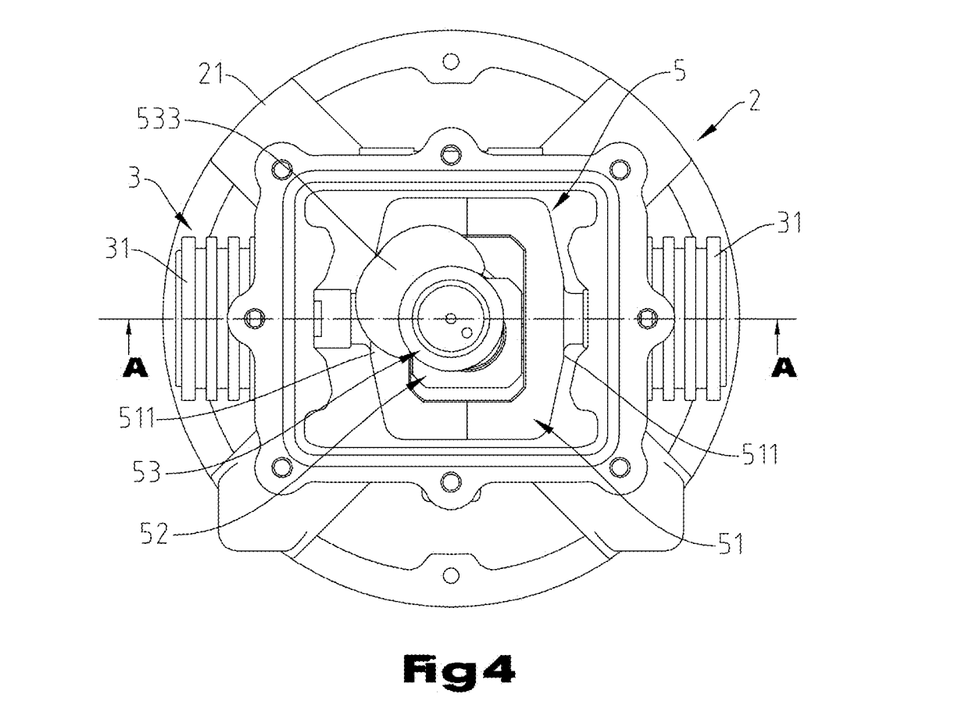
FIG. 4 is a schematic drawing of the present invention, showing reciprocating motion of the piston devices with the frame member (I).
Figure 5:
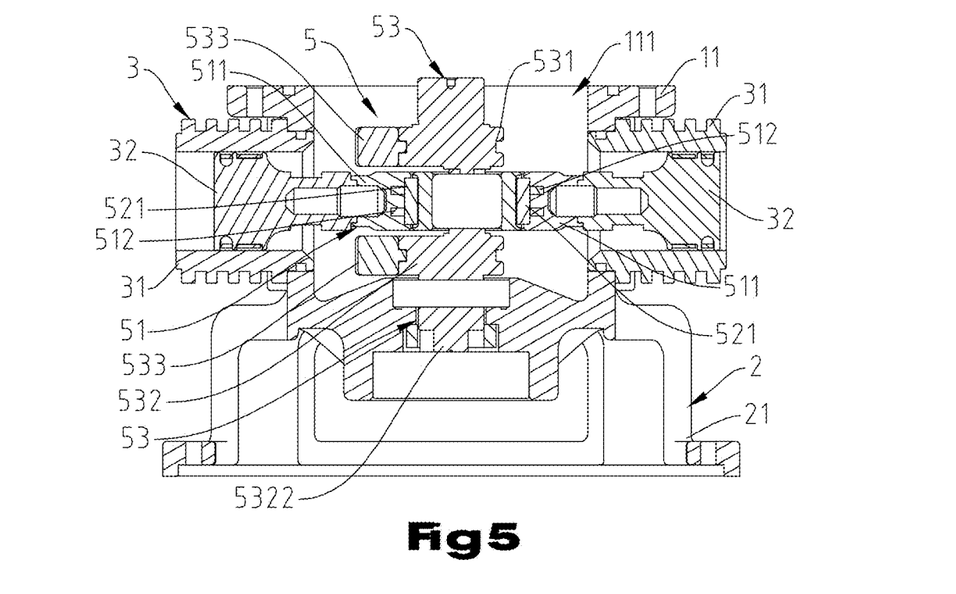
FIG. 5 is a sectional view taken along line A-A of FIG. 4.
Figure 6:
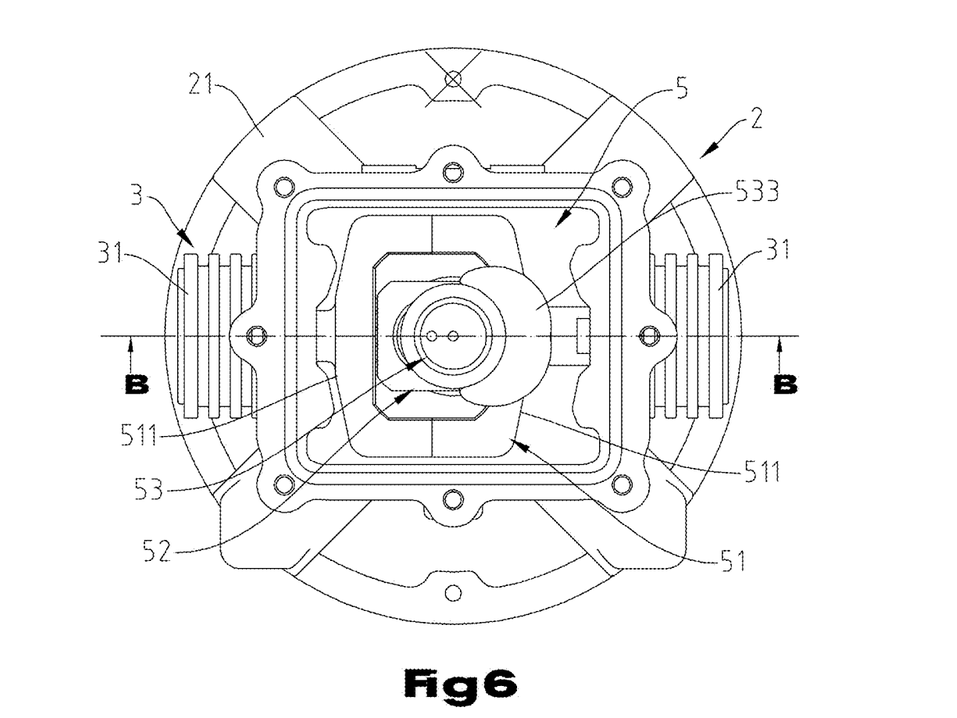
FIG. 6 is a schematic drawing of the present invention, showing the piston devices moved with the frame member (II).
Figure 7:
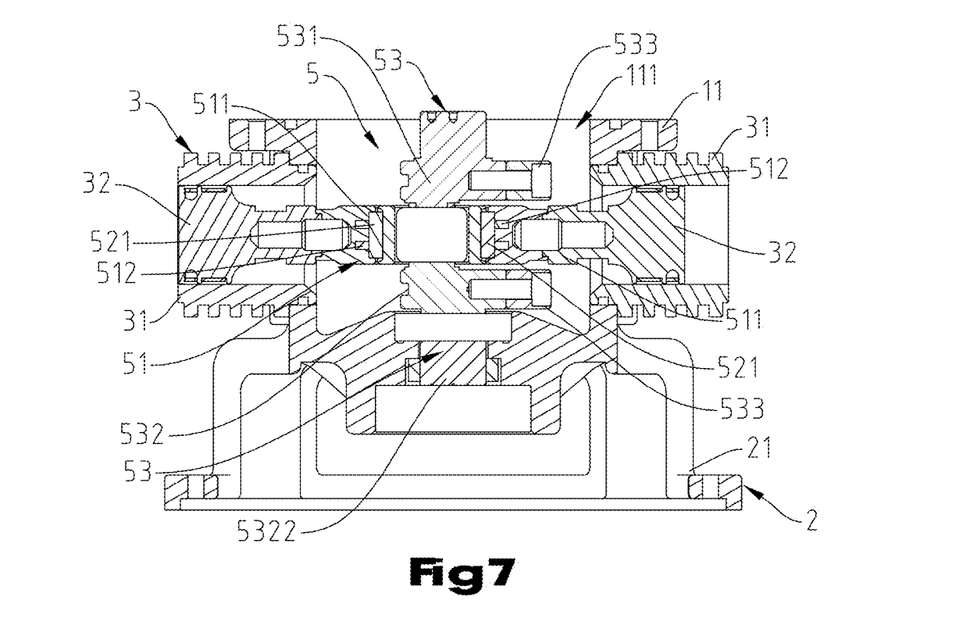
FIG. 7 is a sectional view taken along line B-B of FIG. 6.
Figure 8:
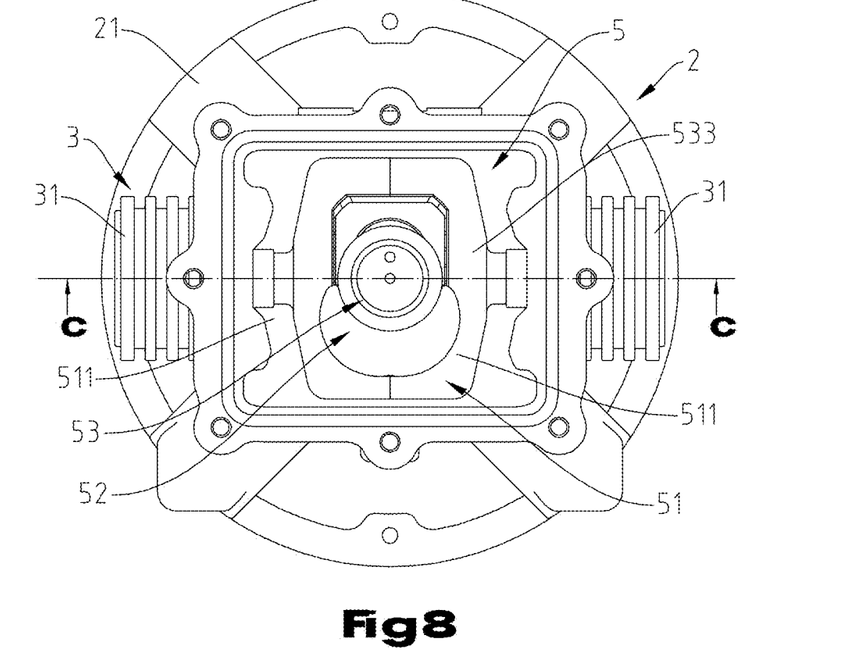
FIG. 8 is a schematic drawing of the present invention, showing displacement of the sliding block in the frame member (I).
Figure 9:
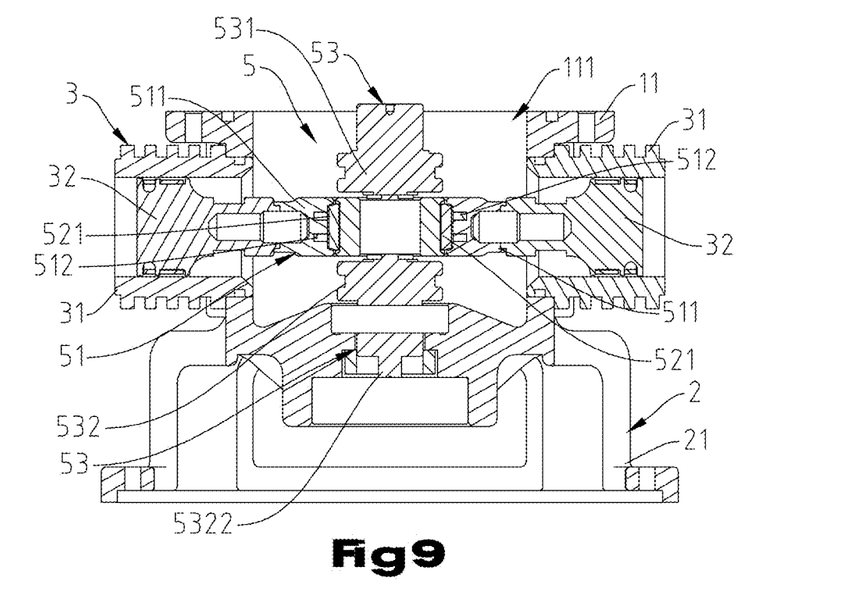
FIG. 9 is a sectional view taken along line C-C of FIG. 8.
Figure 10:
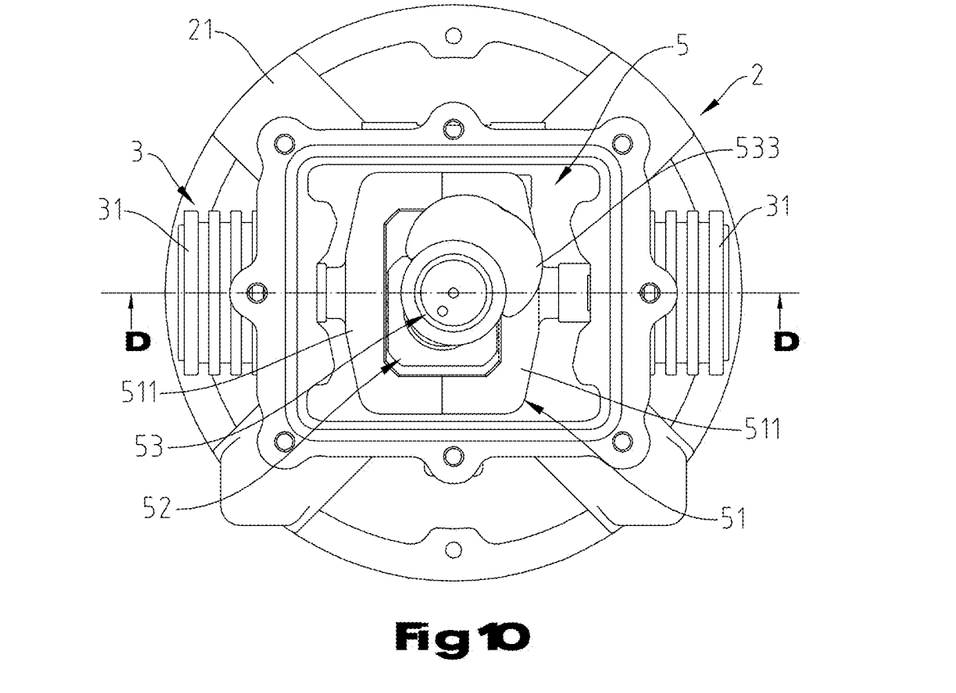
FIG. 10 is a schematic drawing of the present invention, showing displacement of the sliding block in the frame member (II).
Figure 11:
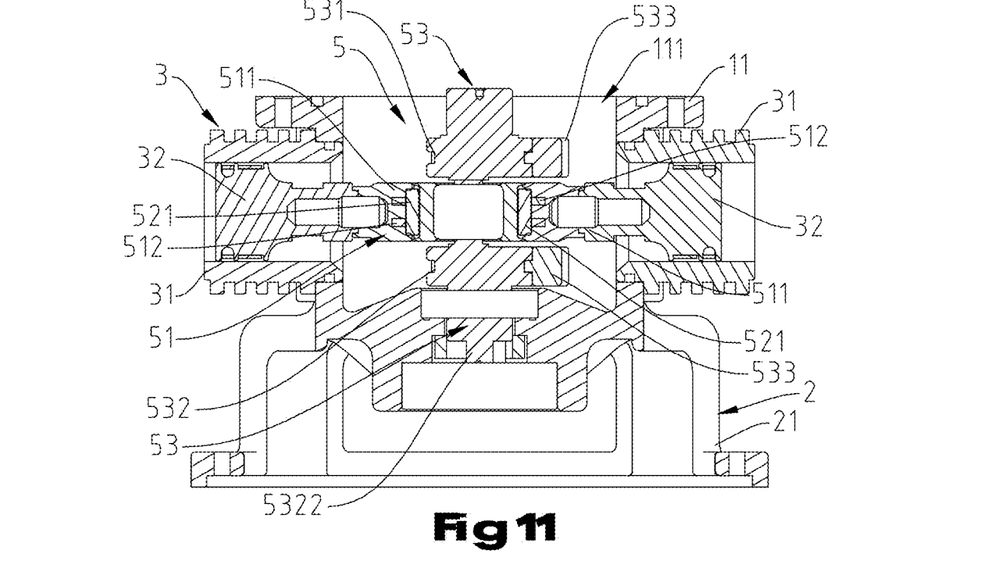
FIG. 11 is a sectional view taken along line D-D of FIG. 10.

Referring to FIGS. 6 and 7 and FIGS. 1, 4 and 5 again, during operation of the refrigerant recovery machine, the motor 22 drives the cam wheel set 53 of the cam wheel assembly 5 to rotate. Because the coupling rod 5311 of the first cam wheel 531 and the coupling tube 5321 of the second cam wheel 532 are coupled together and suspending in the axle bearing 523 in the sliding block 52 and kept away from the axis of rotation of the cam wheel set 52, rotating the cam wheel set 52 on the axis of rotation that extends axially through the pivot rod 5312 of the first cam wheel 531 and the connection rod 5322 of the second cam wheel 532 causes the coupling tube 5321 of the second cam wheel 532 to move the sliding block 52 transversely. During transverse movement of the sliding block 52 by the coupling tube 5321 of the second cam wheel 532, the friction cylinders 521 are moved with the sliding block 52 to touch the wear strips 512 in the frame member 51, causing the frame member 51 to be moved transversely back and forth. At the same time, the pistons 32 are moved with the frame member 51 relative to the respective barrels 31, causing the inside space of each barrel 31 to be varied, and therefore the pump component sets 4 are reciprocated to draw a fluid substance through the inlet pipe 42 into the valve seat 41 toward the outlet pipe 43.

Referring to FIGS. 8~11 and FIG. 1 again, when the coupling tube 5321 of the second cam wheel 532 moves the sliding block 52 longitudinally, the sliding block 52 is moved up and down in the frame member 51, causing the friction cylinders 521 to be moved along the respective wear strips 512. Because the wear strips 512 have a high rigidity, they do not wear easily with use, prolonging the service life of the cam wheel assembly 5.

In conclusion, the invention provides a cam wheel assembly for refrigerant recovery machine, which has the following advantages and features:

1. The cam wheel assembly 5 is comprised of a frame member 51, a sliding block 52 and a cam wheel set 53; the cam wheel set 53 of the cam wheel assembly is comprised of a first cam wheel 531 and a second cam wheel 532 arranged at two opposite sides relative to the sliding block 52. During installation, the frame member 51 and the sliding block 52 are assembled at first, and then the first cam wheel 531 and the second cam wheel 532 are inserted into the axle bearing 523 in the sliding block 52 and connected to each other. This installation procedure is simple and easy. When the axle bearing 523 is damaged, it can be conveniently replaced with a new one by the user.

2. The friction cylinders 521 are arranged on each of the two opposite sidewalls of the sliding block 52 in parallel, facilitating movement of the sliding block 52 without causing noises.

3. The frame member 51 is an open frame formed of two symmetrical frame parts 511. Further, wear strips 512 are mounted in each of the two frame parts 511 of the frame member 51 for the contact of the friction cylinders 521 during movement of the sliding block 52, prolonging the service life of the cam wheel assembly 5.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A refrigerant recovery machine comprising a shell and a cam wheel assembly mounted in a rear side of said shell, wherein said cam wheel assembly comprises:

an open frame member comprising two symmetrical frame parts, each said frame part comprising a base and two arms respectively extending in a parallel manner from two distal ends of said base, and at least a fastening member affixing each respective arm of one said frame part to the corresponding arm of the other said frame part;

at least a wear strip fixedly mounted to the base of each frame part, each wear strip having a higher rigidity than said open frame member;

a sliding block movable up and down in said open frame member, said sliding block comprising a center through hole and an axle bearing mounted in said center through hole, a plurality of friction cylinders arranged on opposing sides of said sliding block and disposed in corresponding contact with said wear strips; and a cam wheel set inserted through said axle bearing of said sliding block, said cam wheel set comprising a first cam wheel and a second cam wheel, said first cam wheel comprising a coupling rod eccentrically extended from one side thereof and inserted into said axle bearing of said sliding block, said second cam wheel comprising a coupling tube eccentrically extended from one side thereof and coupled to said coupling rod of said first cam wheel in said axle bearing of said sliding block.

2. The cam wheel assembly as claimed in claim 1, wherein said first cam wheel further comprises a pivot rod perpendicularly extended from the center of an opposite side thereof for pivotally connecting to an external support means; said second cam wheel further comprises a connection rod perpendicularly extended from the center of an opposite side thereof for connection to an external motor.

3. The cam wheel assembly as claimed in claim 1, further comprising a plurality of counterweights respectively mounted on the periphery of said first cam wheel and the periphery of said second cam wheel.

4. The cam wheel assembly as claimed in claim 1, wherein said axle bearing is a ball bearing.

5. The cam wheel assembly as claimed in claim 1, wherein said axle bearing is a needle bearing.

6. The cam wheel assembly as claimed in claim 1, further comprising a motor and fan set mounted in one end of said shell, said motor and fan set comprising a motor coupled to one end of said cam wheel set, which has an opposite end thereof pivotally supported in said shell, two piston devices mounted in two opposite lateral sides of said shell and respectively connected to two opposite sides of said open frame member of said cam wheel assembly and two pump component sets respectively connected to said piston devices.

* * * * *